US009495408B2

(12) United States Patent
Lehr et al.

(10) Patent No.: US 9,495,408 B2
(45) **Date of Patent: *Nov. 15, 2016**

(54) MAINTAINING A DATA STRUCTURE WITH DATA SET NAMES AND POINTERS TO A PLURALITY OF CATALOGS

(71) Applicant: International Business Machines Corporation, Armonk, NY (US)

(72) Inventors: Douglas L. Lehr, Austin, TX (US); Franklin E. McCune, Tucson, AZ (US); David C. Reed, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/847,312

(22) Filed: Sep. 8, 2015

(65) Prior Publication Data

US 2015/0379067 A1 Dec. 31, 2015

Related U.S. Application Data

(63) Continuation of application No. 13/926,898, filed on Jun. 25, 2013, now Pat. No. 9,165,022, which is a continuation of application No. 13/448,979, filed on Apr. 17, 2012, now Pat. No. 8,495,029, which is a continuation of application No. 12/358,177, filed on Jan. 22, 2009, now Pat. No. 8,234,242.

(51) Int. Cl.
*G06F 7/00* (2006.01)
*G06F 17/30* (2006.01)

(52) U.S. Cl.
CPC ... *G06F 17/30371* (2013.01); *G06F 17/30011* (2013.01); *G06F 17/30091* (2013.01); *G06F 17/30194* (2013.01); *G06F 17/30303* (2013.01); *G06F 17/30312* (2013.01); *G06F 17/30342* (2013.01); *G06F 17/30598* (2013.01)

(58) Field of Classification Search
CPC .................. G06F 17/30011; G06F 17/30303; G06F 17/30371; G06F 17/30194
USPC ........................................................ 707/687
See application file for complete search history.

(56) References Cited

U.S. PATENT DOCUMENTS 4,408,273 A 10/1983 Plow
6,393,537 B1 5/2002 Kern et al.

(Continued)

OTHER PUBLICATIONS

Tate, J.,et al., "Enhanced Catalog Sharing and Management" [online], SG24-5594-00, Jul. 1999. Retrieved from the Internet at <URL: http://www.redbooks.ibm.com>, 148 pp.

(Continued)

*Primary Examiner* — Mark E Hershley
(74) *Attorney, Agent, or Firm* — Rabindranath Dutta; Konrad Raynes Davda & Victor LLP

(57) ABSTRACT

A plurality of catalogs are maintained, and wherein each catalog of the plurality of catalogs includes data sets and attributes of the data sets. An indication that a new data set is to be defined is received. A selected catalog is determined from the plurality of catalogs, wherein the selected catalog is suitable for including the new data set and attributes of the new data set. An entry that indicates a data set name corresponding to the new data set and an index to the selected catalog is inserted in a group table.

15 Claims, 9 Drawing Sheets

(56) References Cited

U.S. PATENT DOCUMENTS

| | | | | |
|---|---|---|---|---|
| 6,457,053 | B1 | 9/2002 | Satagopan et al. | |
| 6,687,717 | B1 | 2/2004 | Hamilton et al. | |
| 6,996,559 | B1 | 2/2006 | Beshai | |
| 7,356,493 | B2 | 4/2008 | Choi et al. | |
| 7,580,941 | B2 | 8/2009 | Narasayya et al. | |
| 8,234,242 | B2 | 7/2012 | Lehr et al. | |
| 8,495,029 | B2 | 7/2013 | Lehr et al. | |
| 2003/0182291 | A1 | 9/2003 | Kurupati et al. | |
| 2005/0187990 | A1* | 8/2005 | Pace | G06F 17/30067 |
| 2007/0050269 | A1* | 3/2007 | Choi | G06Q 30/0641 705/27.1 |
| 2007/0088769 | A1 | 4/2007 | Pace et al. | |
| 2007/0288495 | A1 | 12/2007 | Narasayya et al. | |
| 2008/0195802 | A1 | 8/2008 | Lee et al. | |
| 2008/0256118 | A1* | 10/2008 | Ziegler | G06F 17/30312 |
| 2009/0043827 | A1* | 2/2009 | Mitchell | G06F 17/30309 |
| 2009/0319581 | A1* | 12/2009 | Seifert | G06F 17/30312 |
| 2010/0185680 | A1* | 7/2010 | Gilboa | H04L 63/1441 707/802 |
| 2013/0290341 | A1 | 10/2013 | Lehr et al. | |

OTHER PUBLICATIONS

Watson, C., "Tuning Letter", 2001, No. 1, 47 pp. 1-47.

Office Action, dated Mar. 16, 2011, for U.S. Appl. No. 12/358,177, filed Jan. 22, 2009, invented by Douglas Lehr et al., Total 14 pages.

Response to Office Action, dated Mar. 16, 2011, for U.S. Appl. No. 12/358,177, filed Jan. 22, 2009, invented by Douglas Lehr et al., Total 14 pages.

Final Office Action, dated Sep. 1, 2011, for U.S. Appl. No. 12/358,177, filed Jan. 22, 2009, invented by Douglas Lehr et al., Total 15 pages.

RCE and Amendment dated Sep. 1, 2011,for U.S. Appl. No. 12/358,177, filed Jan. 22, 2009, invented by Douglas Lehr et al., Total 12 pages.

Notice of Allowance, dated Mar. 22, 2012, for U.S. Appl. No. 12/358,177, filed Jan. 22, 2009, invented by Douglas Lehr et al., Total 25 pages.

Office Action, dated Oct. 4, 2012, for U.S. Appl. No. 13/448,979, filed Apr. 17, 2012, by inventor Douglas Lehr et al., Total 18 pages.

Response to Office Action, dated Jan. 4, 2013, for U.S. Appl. No. 13/448,979, filed Apr. 17, 2012, by inventor Douglas Lehr et al., Total 8 pages.

Notice of Allowance, dated Oct. 4, 2012, for U.S. Appl. No. 13/448,979, filed Apr. 17, 2012, by inventor Douglas Lehr et al., Total 9 pages.

Office Action, dated Dec. 20, 2013, for U.S. Appl. No. 13/926,898, filed Jun. 25, 2013, invented by Douglas Lehr et al., Total 20 pages.

Response to Office Action, dated Mar. 20, 2014, for U.S. Appl. No. 13/926,898, filed Jun. 25, 2013, invented by Douglas Lehr et al., Total 13 pages.

Final Office Action, dated Jul. 24, 2014, for U.S. Appl. No. 13/926,898, filed Jun. 25, 2013, invented by Douglas Lehr et al., Total 19 pages.

Response to Final Office Action, dated Oct. 24, 2014, for U.S. Appl. No. 13/926,898, filed Jun. 25, 2013, invented by Douglas Lehr et al., Total 10 pages.

Office Action, dated Feb. 13, 2015, for U.S. Appl. No. 13/926,898, filed Jun. 25, 2013, invented by Douglas Lehr et al., Total 15 pages.

Response to Office Action, dated May 13, 2015, for U.S. Appl. No. 13/926,898, filed Jun. 25, 2013, invented by Douglas Lehr et al., Total 7 pages.

Notice of Allowance, dated Jun. 5, 2015, for U.S. Appl. No. 13/926,898, filed Jun. 25, 2013, invented by Douglas Lehr et al., Total 8 pages.

* cited by examiner

MAINTAINING A DATA STRUCTURE WITH DATA SET NAMES AND POINTERS TO A PLURALITY OF CATALOGS

CROSS-REFERENCE TO RELATED APPLICATIONS

This application is a continuation of application Ser. No. 13/926,898 filed Jun. 25, 2013, wherein application Ser. No. 13/926,898 is a continuation of application Ser. No. 13/448,979 filed Apr. 17, 2012, wherein application Ser. No. 13/448,979 is a continuation of application Ser. No. 12/358,177 filed on Jan. 22, 2009, wherein application Ser. No. 13/926,898, application Ser. No. 13/448,979 and application Ser. No. 13/448,979 are incorporated herein by reference in their entirety.

BACKGROUND

1. Field

The disclosure relates to a method, a system, and an article of manufacture for maintaining a data structure with data set names and pointers to a plurality of catalogs.

2. Background

A data set is a logical representation of data that is stored in a computational system. For example, a file is data set that is maintained in certain operating systems. Certain operating system maintain a plurality of user catalogs, wherein each user catalog stores directly or indirectly a plurality of data sets and also stores attributes of the plurality of data sets.

A master catalog may be maintained in certain operating systems, wherein a catalog alias may provide a means for directing search requests for data sets to a single user catalog based on the high level qualifier corresponding to a data set entry.

SUMMARY OF THE PREFERRED EMBODIMENTS

Provided are a method, a system, an article of manufacture, and a method for deploying computing infrastructure, wherein a plurality of catalogs are maintained, and wherein each catalog of the plurality of catalogs includes data sets and attributes of the data sets. An indication that a new data set is to be defined is received. A selected catalog is determined from the plurality of catalogs, wherein the selected catalog is suitable for including the new data set and attributes of the new data set. An entry that indicates a data set name corresponding to the new data set and an index to the selected catalog is inserted in a group table.

In additional embodiments, a determination is made that a selected data set is to be deleted. A selected entry corresponding to the selected data set is deleted in the group table.

In yet additional embodiments, a determination is made that an attribute of a selected data set is to be modified. A selected catalog of the plurality of catalogs is updated with modifications to the attribute, wherein the selected catalog includes the selected data set, and wherein any change to the group table is avoided.

In further embodiments, a determination is made that an error occurs while performing at least one of an update to a data set and a read access on the data set. A further determination is made as to which catalog causes the error. A suitable catalog to which the data set should be moved is determined. One or more entries of the group table are updated, in response to moving the data set to the determined suitable catalog.

In still further embodiments, determining a selected catalog from the plurality of catalogs is based on: an amount of available space on each of the plurality of catalogs, wherein those catalogs that have greater available space are preferred as the selected catalog over those catalogs that have lesser available space; and an amount of contention activity on each of the plurality of catalogs, wherein those catalogs that have lesser contention activity are preferred as the selected catalog over those catalogs that have greater contention activity, wherein access by a plurality of threads or processes of one catalog causes contention among the plurality or threads or processes that access the one catalog.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Master Catalog, User Catalogs, and Group Table

Figure 1:
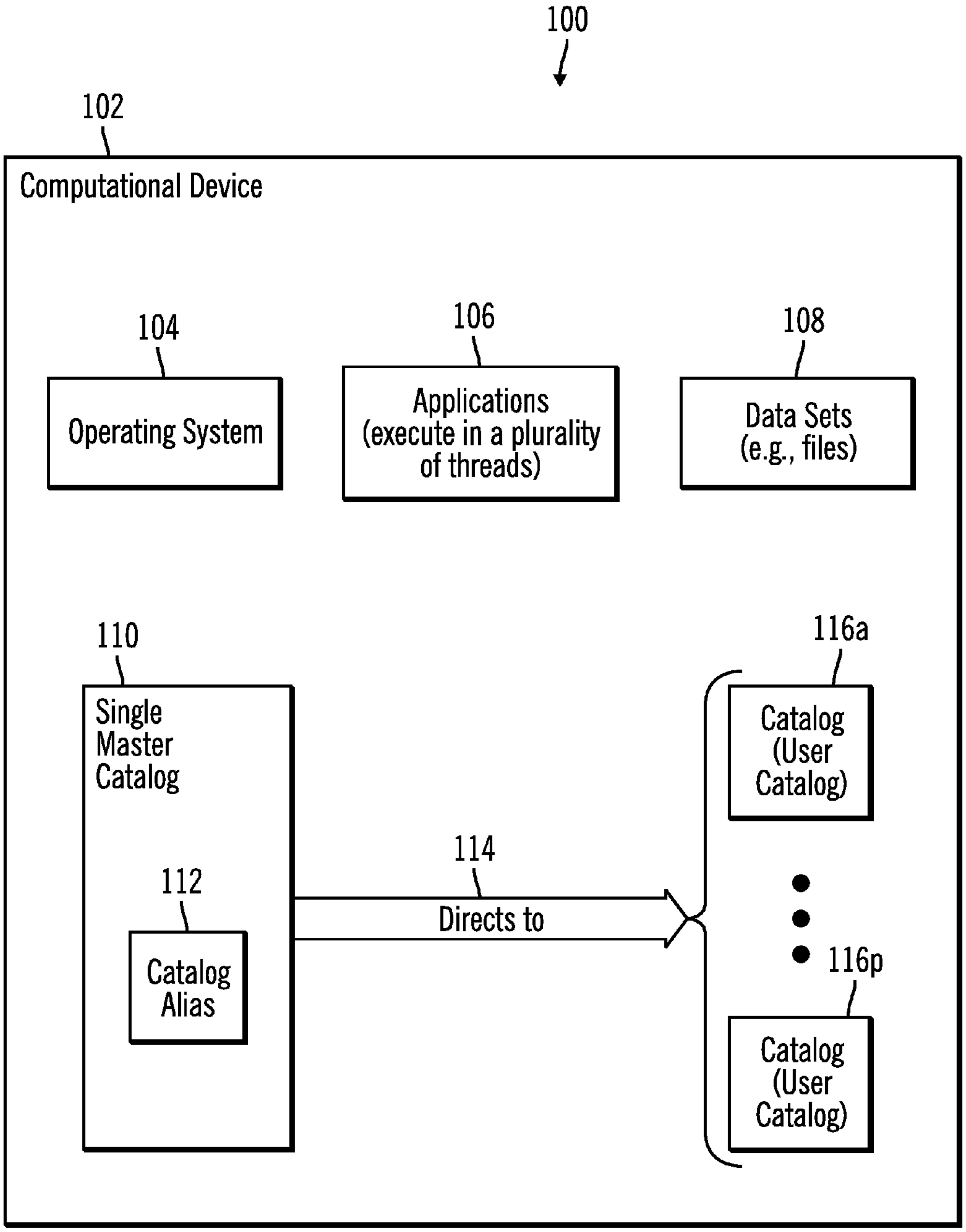
FIG. 1 illustrates a block diagram of a first computational device included in a first computing environment, in accordance with certain embodiments.

FIG. 1 illustrates a block diagram of a first computing environment 100 that includes a first computational device 102, in accordance with certain embodiments. The computational device 100 may include an operating system 104, applications 106 that may execute in a plurality of threads, and data sets 108. A single master catalog 110 that includes a catalog alias 112 that directs (reference numeral 114) requests for data sets to user catalogs 116*a* . . . 116*p* is also included in the first computational device 102, wherein the user catalogs 116*a* . . . 116*p* are also referred to as catalogs.

The master catalog 110 is one of the users of shared resources and the maser catalog 110 maintains the plurality of catalogs 116*a* . . . 116*p*. A catalog, such as any of the catalogs 116*a* . . . 116*n*, also represents one of the main bottlenecks affecting the applications 106 since the applications 106 are reliant on the catalog to locate data sets that are needed. When an application executes in multiple threads, parallel requests to a single catalog where all of the application's data resides may lead to contention. The ability to reduce some of this contention may benefit overall performance.

Certain embodiments provide a mechanism in which a catalog alias points to a set of catalogs rather than to a single catalog. Aliases provide a means to direct search requests to a single user catalog based on a high level qualifier of a data set entry. Allowing the Alias to resolve to a group of catalogs may relieve contention as requests to update/read entries under this alias may be spread out among a plurality of catalogs. In addition to contention relief, certain embodiments also allow for a recovery from catalog error. If one of the catalogs in a catalog group ceases to function properly, entries from this catalog are moved to other catalogs in the group.

In certain embodiments, a group table is maintained in cache for each catalog group. The group table stores each data set name appended with an index corresponding to the catalog in the group that contains the actual data set entry. In certain embodiments, incoming define activity of new entries may proceed to the catalog within the group with the most available space and least contention activity and a corresponding entry may be inserted in the group table. Contention is not significant in the group table, since the group table is only updated when a new dataset is defined or when an existing data set is deleted. The group table is not updated when attributes (e.g., extent information) of a data set change. The information related to the attributes is kept in the user catalogs. Therefore, the majority of operations on the group table may be read activity which may be suitable for a cache that stores the group table.

Recovery from catalog error may be invoked by monitoring internal catalog errors. If update/read access operations encounter an error, certain embodiments invoke a sequential read of the problem catalog in an attempt to salvage all possible entries that correspond to the problem catalog. As each entry is encountered, an operation may be invoked for selecting the best catalog in the group to substitute the problem catalog in the entries that point to the problem catalog.

Certain embodiments assign data sets to existing or new user catalogs regardless of the name of the new user catalogs. The name, alias, and user catalog are not tied together. This additional flexibility allows a better balancing of data sets across large pools of user catalogs, as existing catalogs fill up or exhibit performance degradation.

Exemplary Embodiments

Figure 2:
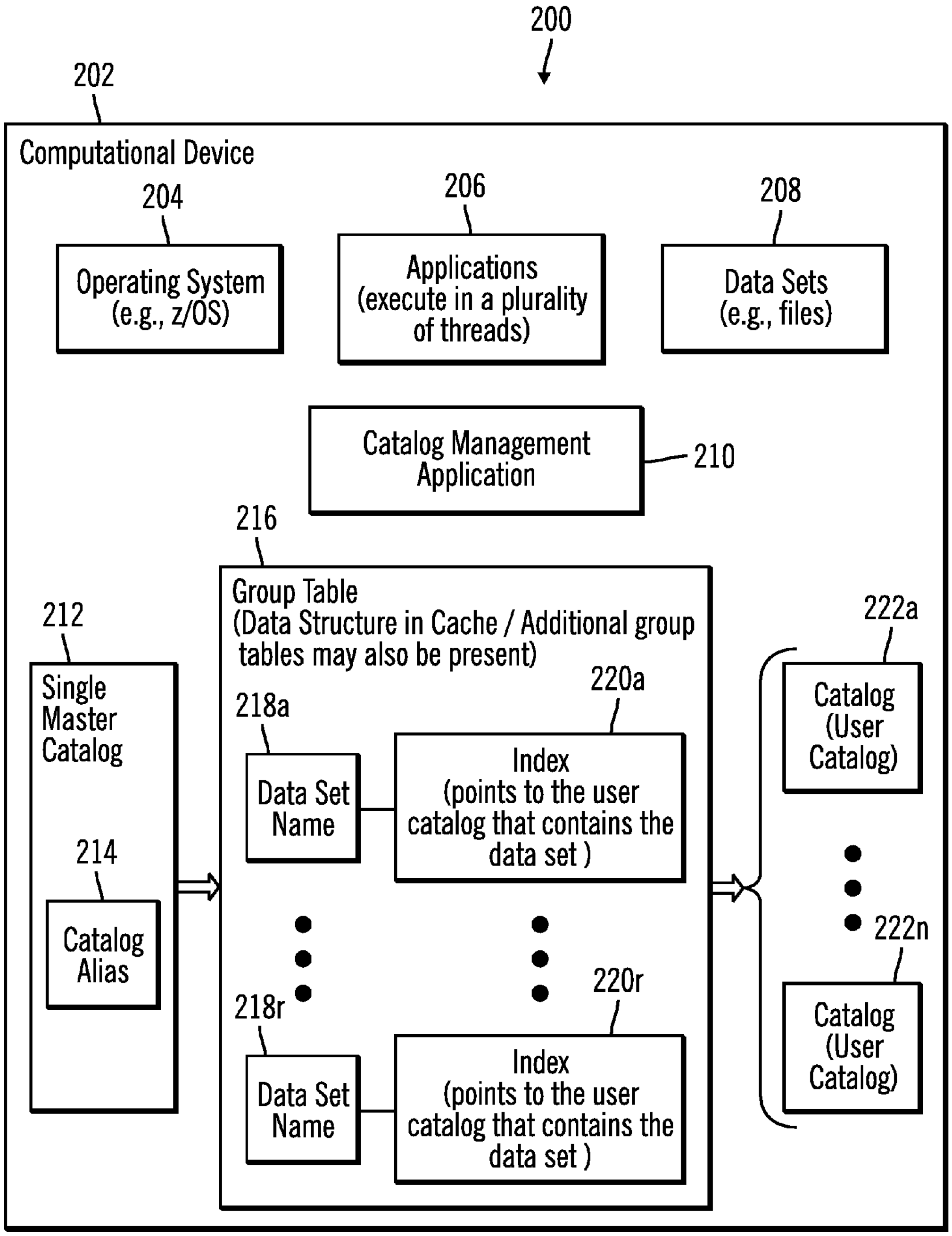
FIG. 2 illustrates a block diagram of a second computational device included in a second computing environment, in accordance with certain embodiments.

FIG. 2 illustrates a block diagram of a second computing environment 200 that includes a second computational device 202, in accordance with certain embodiments. The computational device 202 may include an operating system 204, applications 206 that may execute in a plurality of threads, data sets 208, and a catalog management application 210. The computational device also includes a single master catalog 212 that includes a catalog alias 214 to direct requests for data sets to a group table 216 that includes entries with data sets names 218*a*, , , 218*r* and associated indexes 220*a* . . . 220*r*, wherein the indexes 220*a* . . . 220*r* point to user catalogs 222*a* . . . 222*n*.

The computational device 202 may comprise any suitable computational device known in the art, including a mainframe computer, a mini computer, a personal computer, a server, a client, a host, a telephony device, a storage controller, etc. The catalog management application 210 is an application that may be implemented in hardware, firmware, software or any combination thereof. In certain embodiments, the catalog management application 210 may be included as part of the operating system 204.

The group table 216 is a data structure that may be implemented in a cache of the computation device 202. The group table 216 may be implemented as a table, a list, a set of pointers or references, or as any other suitable data structure. Corresponding to each data set name there is an index in the group table 216. For example, data set name 218*a* has a corresponding index 220*a*, and data set name 218*r* has a corresponding index 220*r*. Each index points to a user catalog of the plurality of user catalogs. For example, index 220*a* may point to user catalog 222*a* if the user catalog 222*a* includes the data set and the attributes corresponding to the data set name 218*a*. The group table 216 is relatively small is size in comparison to the catalogs 222*a* . . . 222*n* and can be readily updated or accessed. In alternative embodiments there may be a plurality of group tables.

Figure 3:
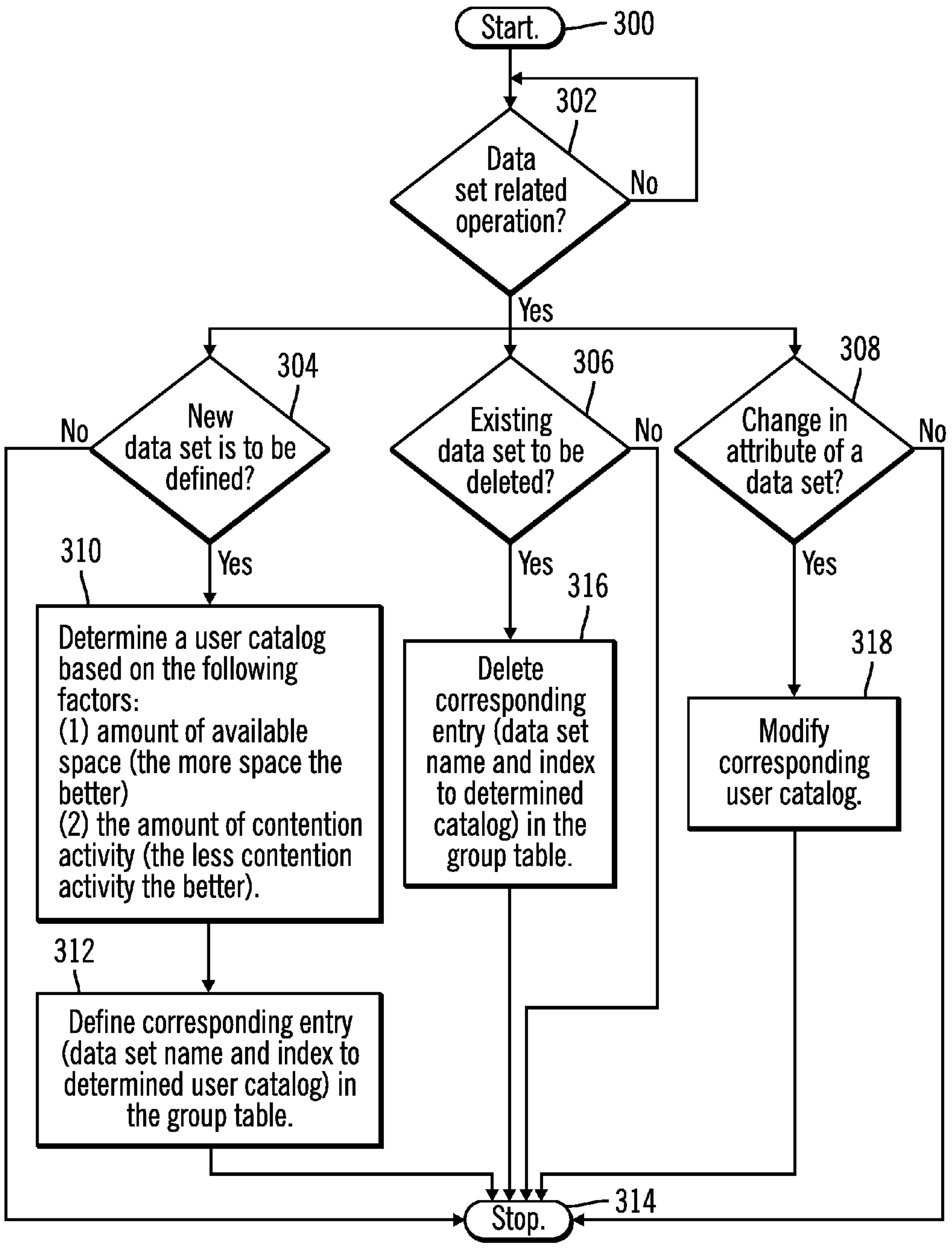
FIG. 3 illustrates a flowchart that shows operations performed in response to definition of new data sets, deletion of data sets, and changes in attributes of data sets, in accordance with certain embodiments.

FIG. 3 illustrates a flowchart that shows operations performed in response to definition of new data sets, deletion of data sets, and changes in attributes of data sets, in accordance with certain embodiments. The operations shown in FIG. 3 may be performed by the catalog management application 210 implemented in the computational device 202 of the computing environment 200.

Control starts (at block 300) and the catalog management application 210 makes a determination (at block 302) as to whether an operation is a data set related operation. If so, control may proceed in parallel to blocks 304, 306, 308. If not, control returns to block 300.

At block 304, the catalog management application 210 determines whether a new data set is to be defined. If so, then the catalog management application 210 determines (at block 310) a user catalog from the plurality of user catalogs 222*a* . . . 222*n* based on the following factors:

(1) amount of available space in each of the user catalogs 222*a* . . . 222*n*, wherein the more space a user catalog has the better is the user catalog for storing the new data set and the attributes of the new data set; and (2) the amount of contention activity in each of the user catalogs 222*a* . . . 222*n*, wherein the less contention activity a user catalog has the better is the user catalog for storing the new data set and the attributes of the new data set.

From block 310, control proceeds to block 312 in which the catalog management application 210 defines, i.e., inserts, a new entry in the group table 216 corresponding to the new data set name and an associated index that points to the determined user catalog in block 310. From block 312 control proceeds to block 314 where the process stops. If no new data set is to be defined at block 304 then control also proceeds to block 314 where the process stops.

At block 306, the catalog management application 210 determines whether an existing data set is to be deleted. If so, the catalog management application 210 deletes (at block 316) in the group table 216 the data set name and the associated index corresponding to the existing data set, and control proceeds to block 314 where the process stops. If at block 306, the catalog management application 210 determines that an existing data set is not be deleted control proceeds to block 314 where the process stops.

At block 308, the catalog management application 210 determines if there is a change in attributes of a data set. If so, no changes have to be made to the group table 216 but the user catalog selected from the user catalogs 222*a* . . . 222*n* that stores the attributes of the data set is modified (at block 318) to change the attributes, and the process stops (at block 314). If at block 308, the catalog management application 210 determines if there is no change in attributes of a data set then control proceeds to block 314 where the process stops.

Therefore, FIG. 3 illustrates certain embodiments in which the group table 216 is modified in response to definitions of new data sets and deletions of existing data sets.

Figure 4:
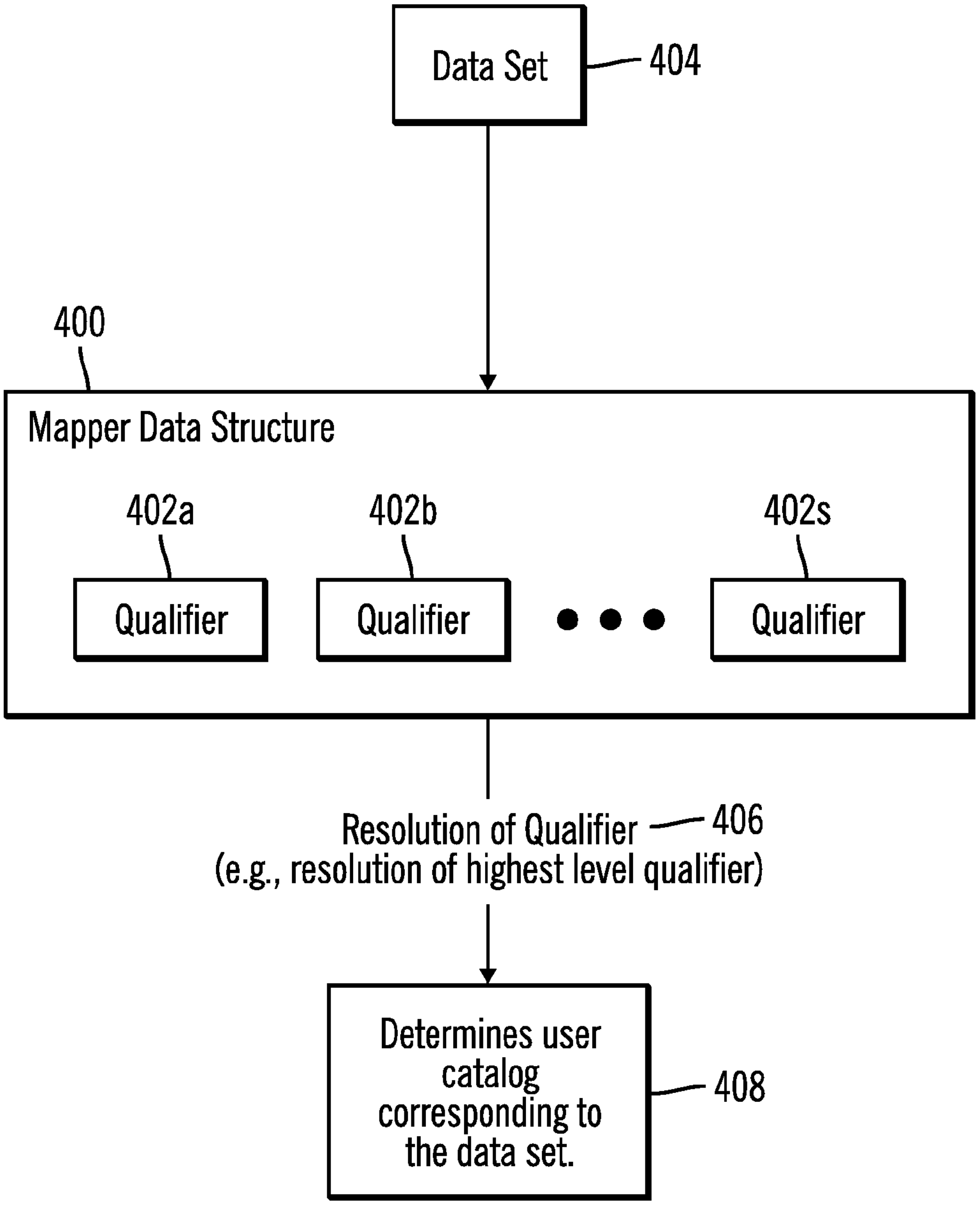
FIG. 4 illustrates a block diagram of a mapper data structure, in accordance with certain embodiments.

FIG. 4 illustrates a block diagram of a mapper data structure 400, in accordance with certain embodiments. The mapper data structure 400 includes a plurality of qualifiers 402*a*, 402*b*, . . . , 402*s*, wherein 402*a* is the highest level qualifier and 402*s* is the lowest level qualifier. Each qualifier may be a sequence of bits or bytes. However, the qualifiers may also be represented via other mechanisms. One or more qualifiers that correspond to an exemplary data set 404 are mapped to determine the user catalog corresponding to the data set 404. For example, in certain embodiments, the resolution of qualifiers (shown by reference numeral 406) is based on resolution of the highest level qualifier 402*a* to determine (reference numeral 408) the user catalog corresponding to the data set 404.

Figure 5:
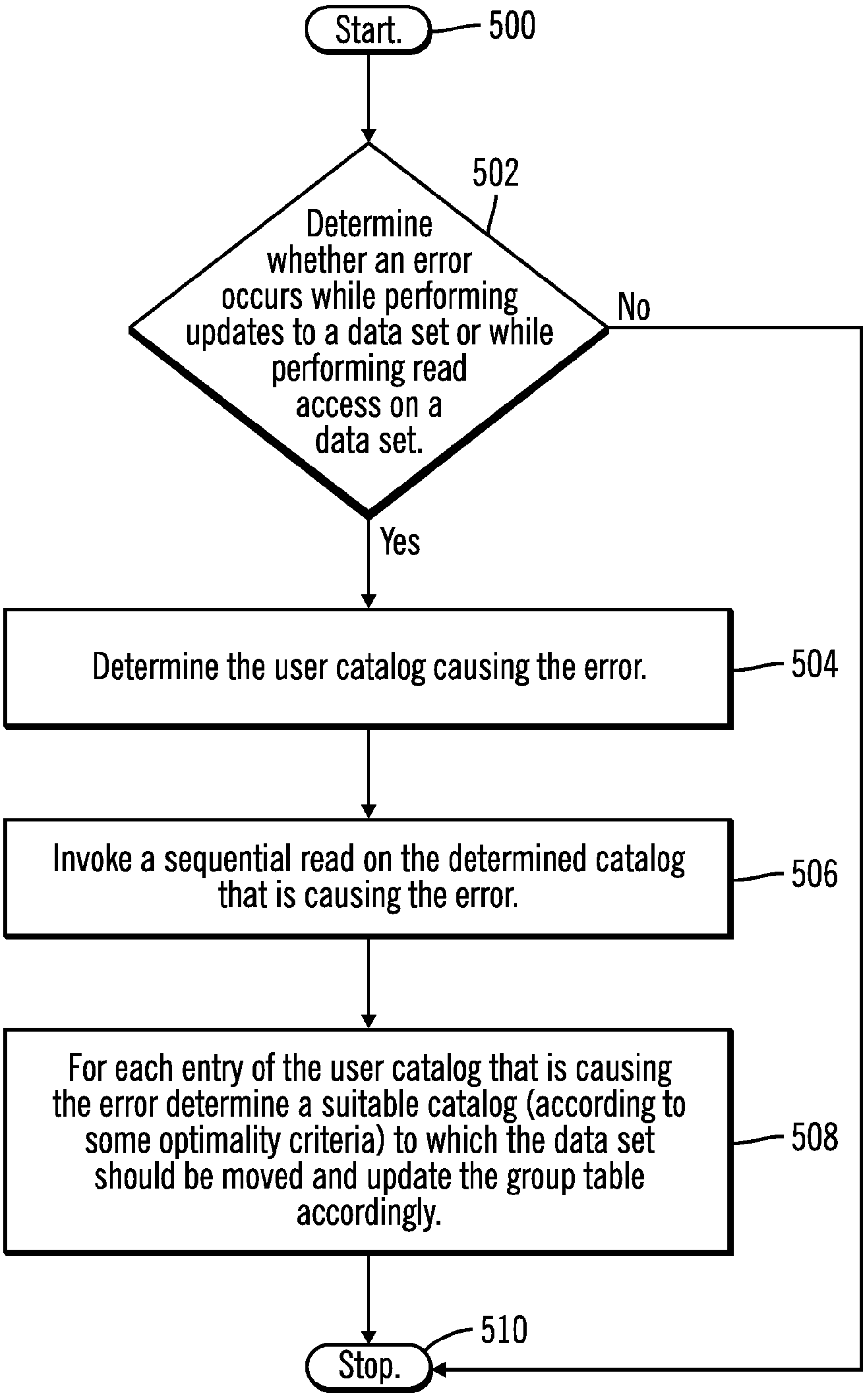
FIG. 5 illustrates a flowchart that shows operations for reorganizing entries of a group table in response to errors associated with a catalog, in accordance with certain embodiments.

FIG. 5 illustrates a flowchart that shows operations for reorganizing entries of a group table in response to errors associated with a catalog, in accordance with certain embodiments. The operations shown in FIG. 5 may be performed by the catalog management application 210 implemented in the computational device 202 of the computing environment 200.

Control starts (at block 500) and proceeds to block 502 in which the catalog management application 210 determines whether an error occurs while performing updates to a data set or while performing read access on a data set. If so, the catalog management application determines (at block 504) the user catalog (e.g., one of the user catalogs 222*a* . . . 222*n*) that is causing the error and then invokes (at block 506) a sequential read on the determined catalog that is causing the error. For each entry of the determined user catalog that is causing the error, the catalog management application 210 determines (at block 508) a suitable catalog (according to some optimality criteria) to which the data set should be moved and then updates the group table 216 accordingly, and subsequently the process stops (at block 510). The process also stops (at block 510) if the catalog management application 210 determines (at block 502) that no error occurs while performing updates to a data set or while performing read access on a data set.

Figure 6:
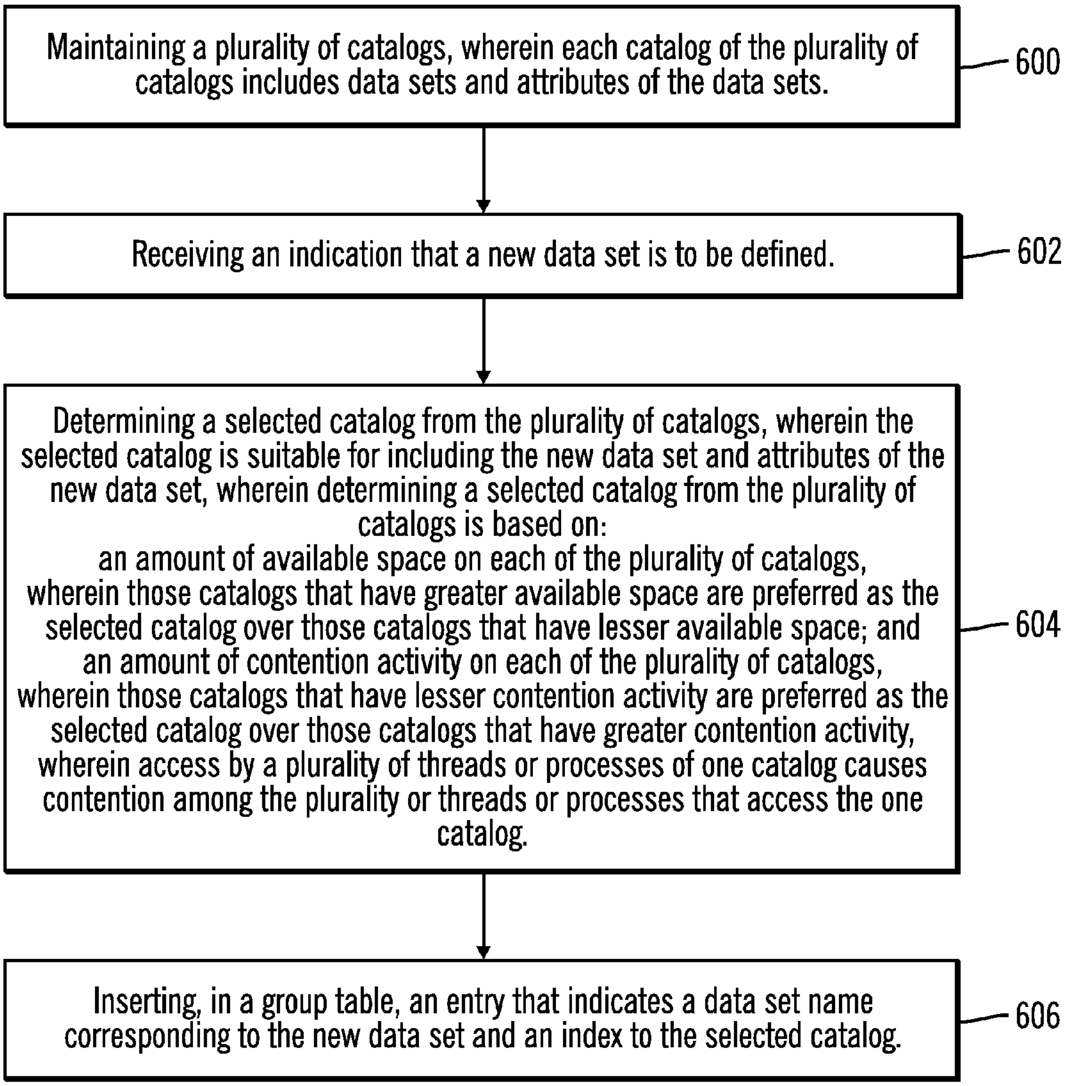
FIG. 6 illustrates a flowchart that shows operations for insertion of entries in a group table, in accordance with certain embodiments.

FIG. 6 illustrates a flowchart that shows operations for insertion of entries in a group table, in accordance with certain embodiments. The operations shown in FIG. 6 may be performed by the catalog management application 210 implemented in the computational device 202 of the computing environment 200.

Control starts at block 600 in which the catalog management application 210 maintains a plurality of catalogs 222*a* . . . 222*n*, and wherein each catalog of the plurality of catalogs 222*a* . . . 222*n* includes data sets and attributes of the data sets. The catalog management application 210 receives (at block 602) an indication that a new data set is to be defined.

Control proceeds to block 604, where that catalog management application 210 determines a selected catalog from the plurality of catalogs 222*a* . . . 222*n*, wherein the selected catalog is suitable for including the new data set and attributes of the new data set. The determining of the selected catalog from the plurality of catalogs is based on: (i) an amount of available space on each of the plurality of catalogs 222*a* . . . 222*n*, wherein those catalogs that have greater available space are preferred as the selected catalog over those catalogs that have lesser available space; and (ii) an amount of contention activity on each of the plurality of catalogs 222*a* . . . 222*n*, wherein those catalogs that have lesser contention activity are preferred as the selected catalog over those catalogs that have greater contention activity, wherein access by a plurality of threads or processes of one catalog causes contention among the plurality or threads or processes that access the one catalog.

From block 604 control proceeds to block 606 where the catalog management application inserts an entry that indicates a data set name corresponding to the new data set and an index in the group table 216.

Therefore, FIG. 6 illustrates certain embodiments in which a new data set is defined by inserting an entry having a data set name and an index into the group table 216.

Figure 7:
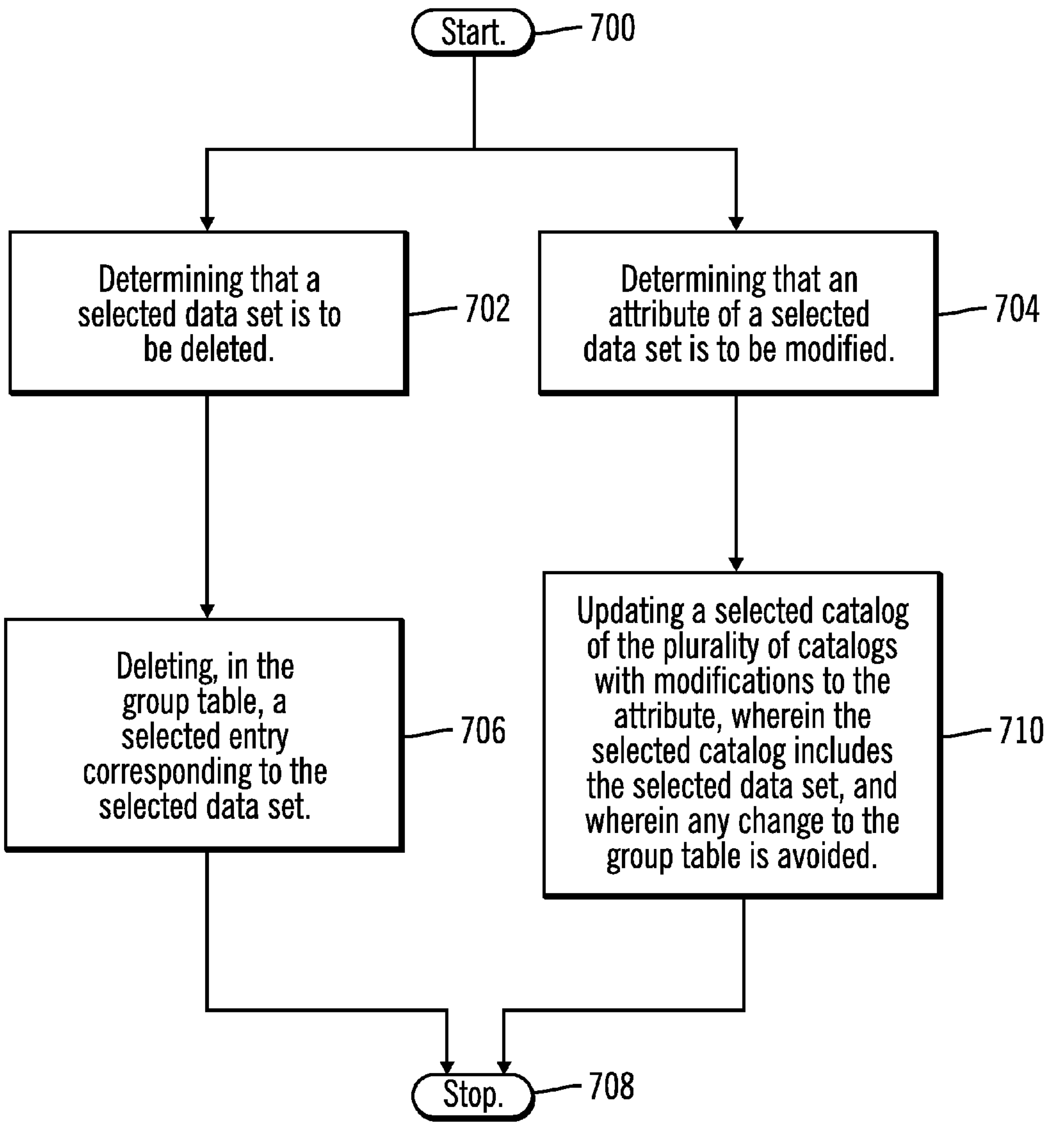
FIG. 7 illustrates a flowchart that shows operations for deletion of entries in a group table and for updating attributes of a data set in accordance with certain embodiments.

FIG. 7 illustrates a flowchart that shows operations for deletion of entries in a group table and for updating attributes of a data set in accordance with certain embodiments. The operations shown in FIG. 7 may be performed by the catalog management application 210 implemented in the computational device 202 of the computing environment 200.

Control starts at block 700 and proceeds in parallel to blocks 702 and 704. At block 702 the catalog management application 210 determines that that a selected data set is to be deleted. The catalog management application 210 deletes (at block 706) a selected entry corresponding to the selected data in the group table 216, and the process stops (at block 708).

At block 704, the catalog management application 210 determines that an attribute of a selected data set is to be modified. The catalog management application 210 updates (at block 710) a selected catalog of the plurality of catalogs 222*a* . . . 222*n* with modifications to the attribute, wherein the selected catalog includes the selected data set, and wherein any change to the group table 216 is avoided.

Therefore, FIG. 7 illustrates certain embodiments in which data sets are deleted by updating the group table 216 and attributes of data sets are updated by updating the appropriate user catalog 222*a* . . . 222*n*.

Figure 8:
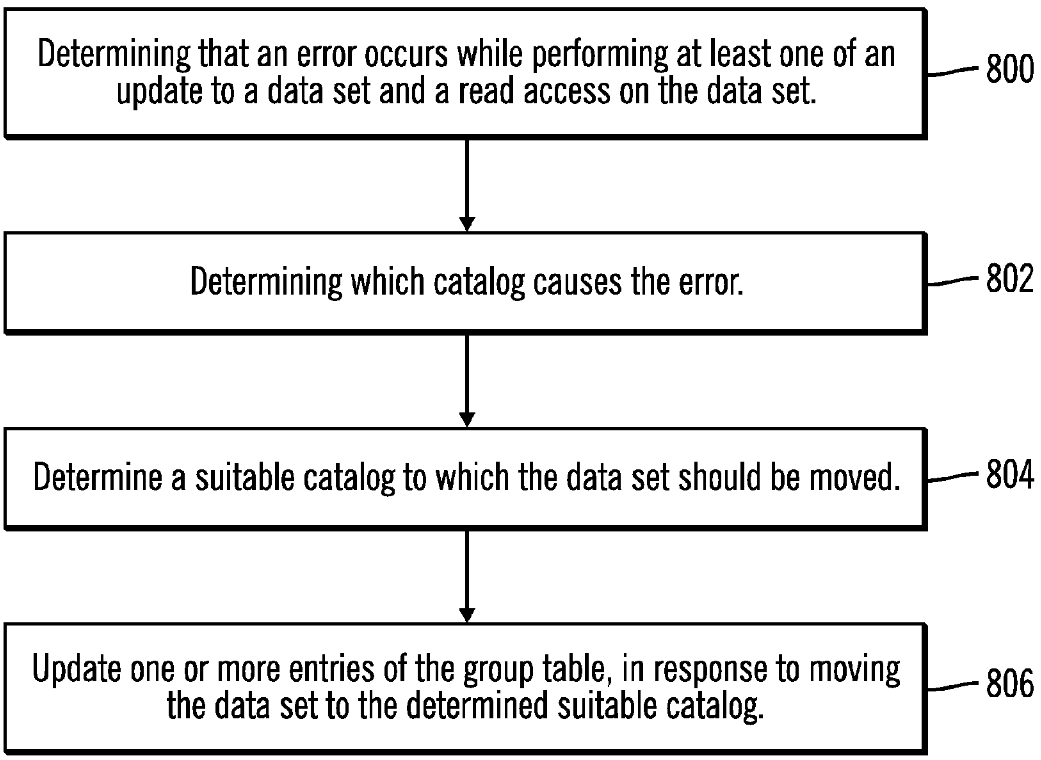
FIG. 8 illustrates a flowchart that shows operations performed in response to an error in a catalog, in accordance with certain embodiments.

FIG. 8 illustrates a flowchart that shows operations performed in response to an error in a catalog, in accordance with certain embodiments. The operations shown in FIG. 8 may be performed by the catalog management application 210 implemented in the computational device 202 of the computing environment 200.

Control starts at block 800 where the catalog management application 210 determines that an error has occurred while performing at least one of an update to a data set and a read access on the data set. The catalog management application 210 determines (at block 802) which catalog has caused the error. Then the catalog management application 210 determines (at block 804) a suitable catalog to which the data set should be moved. The catalog management application 210 updates (at block 806) one or more entries of the group table 216, in response to moving the data set to the determined suitable catalog.

Therefore, FIG. 8 illustrates certain embodiments in which the catalog management application 210 updates the group table 216 in response to an error generated in a catalog that includes a data set.

Certain embodiments described in FIGS. 1-8 maintain a group table 216 in cache, wherein the group table 216 is used to direct requests to an appropriate user catalog for a data set. Updates the group table 216 are relatively less time consuming in comparison to updates to the user catalogs. Additionally, the size of the group table 216 is smaller in comparison to the user catalogs because the group table stores only data set names and corresponding indexes to the user catalogs. Furthermore, in response to a catalog error, alternative catalogs may be used and the group table 216 may be updated accordingly.

In certain alternative embodiments, there may be one or more additional group tables beyond the exemplary group table 216 shown in FIG. 2, i.e., there may be a plurality of group tables implemented in the computational device 202. In such embodiments, the alias structure may direct the data set entry to a specific group table of the plurality of group tables. For example, the alias structure may direct a data set entry to the exemplary group table 216. The exemplary group table 216 may then direct the data set entry into a specific user catalog selected from the user catalogs 222*a* . . . 222*n*.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 9:
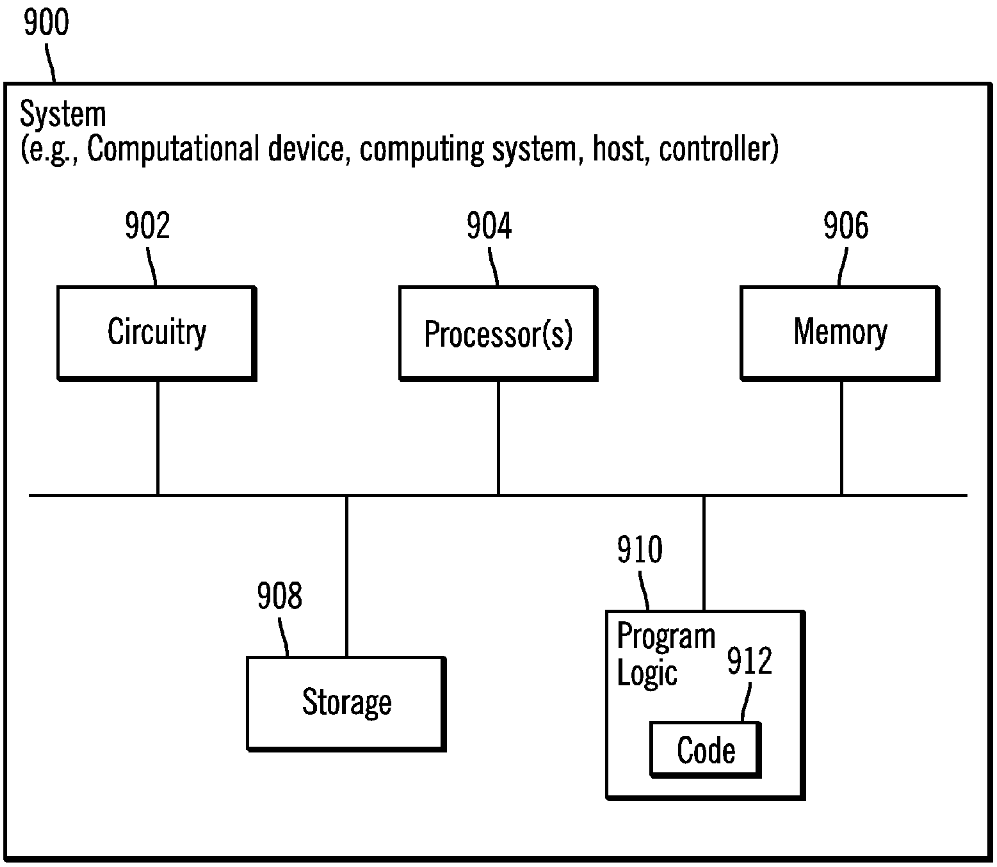
FIG. 9 illustrates a block diagram that shows certain elements that may be included in the computational device of FIG. 2, in accordance with certain embodiments.

FIG. 9 illustrates a block diagram that shows certain elements that may be included in the computational device 202 of FIG. 2, in accordance with certain embodiments. One or more of the computational devices 202 either individually or collectively may also be referred to as a system 900, and may include a circuitry 902 that may in certain embodiments include a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-9 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-9 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising determining, via a processor, a user catalog that has a greater amount of available space in comparison to other user catalogs of a plurality of user catalogs, wherein there is a lesser amount of contention among a plurality of threads or processes to access the determined user catalog in comparison to the other user catalogs, and wherein the user catalog is used to store a new data set;

subsequent to determining the user catalog, inserting in a group table, an entry that indicates a data set name corresponding to the new data set and an index to the determined user catalog;

directing requests for any data sets to the group table;

determining that an error occurs while performing at least one of an update to a data set and a read access on the data set;

determining which user catalog causes the error and invoking a sequential read on the user catalog that causes the error;

for each entry of the user catalog that causes the error, determining a suitable user catalog to which the data set should be moved; and updating one or more entries of the group table, in response to moving the data set to the determined suitable user catalog.

2. The method of claim 1, the method further comprising:

determining that a selected data set is to be deleted.

3. The method of claim 2, the method further comprising:

deleting, in the group table, via a directing by a catalog alias of a single master catalog, a selected entry corresponding to the selected data set.

4. The method of claim 1, wherein access by a plurality of threads or processes of one user catalog causes contention among the plurality or threads or processes that access the one user catalog.

5. The method of claim 1, wherein the suitable user catalog is determined based on an optimality criterion.

6. A system, comprising:

a memory; and a processor coupled to the memory, wherein the processor executes operations, the operations comprising:

determining a user catalog that has a greater amount of available space in comparison to other user catalogs of a plurality of user catalogs, wherein there is a lesser amount of contention among a plurality of threads or processes to access the determined user catalog in comparison to the other user catalogs, and wherein the user catalog is used to store a new data set;

subsequent to determining the user catalog, inserting in a group table, an entry that indicates a data set name corresponding to the new data set and an index to the determined user catalog;

directing requests for any data sets to the group table;

determining that an error occurs while performing at least one of an update to a data set and a read access on the data set;

determining which user catalog causes the error and invoking a sequential read on the user catalog that causes the error;

for each entry of the user catalog that causes the error, determining a suitable user catalog to which the data set should be moved; and updating one or more entries of the group table, in response to moving the data set to the determined suitable user catalog.

7. The system of claim 6, the operations further comprising:

determining that a selected data set is to be deleted.

8. The system of claim 7, the operations further comprising:

deleting, in the group table, via a directing by a catalog alias of a single master catalog, a selected entry corresponding to the selected data set.

9. The system of claim 6, wherein access by a plurality of threads or processes of one user catalog causes contention among the plurality or threads or processes that access the one user catalog.

10. The system of claim 6, wherein the suitable user catalog is determined based on an optimality criterion.

11. A non-transitory computer readable storage medium, wherein code stored in the non-transitory computer readable storage medium when executed by a processor causes operations, the operations comprising:

determining a user catalog that has a greater amount of available space in comparison to other user catalogs of a plurality of user catalogs, wherein there is a lesser amount of contention among a plurality of threads or processes to access the determined user catalog in comparison to the other user catalogs, and wherein the user catalog is used to store a new data set;

subsequent to determining the user catalog, inserting in a group table, an entry that indicates a data set name corresponding to the new data set and an index to the determined user catalog;

directing requests for any data sets to the group table;

determining that an error occurs while performing at least one of an update to a data set and a read access on the data set;

determining which user catalog causes the error and invoking a sequential read on the user catalog that causes the error;

for each entry of the user catalog that causes the error, determining a suitable user catalog to which the data set should be moved; and updating one or more entries of the group table, in response to moving the data set to the determined suitable user catalog.

12. The non-transitory computer readable storage medium of claim 11, the operations further comprising:

determining that a selected data set is to be deleted.

13. The non-transitory computer readable storage medium of claim 12, the operations further comprising:

deleting, in the group table, via a directing by a catalog alias of a single master catalog, a selected entry corresponding to the selected data set.

14. The non-transitory computer readable storage medium of claim 11, wherein access by a plurality of threads or processes of one user catalog causes contention among the plurality or threads or processes that access the one user catalog.

15. The non-transitory computer readable storage medium of claim 11, wherein the suitable user catalog is determined based on an optimality criterion.

* * * * *